United States Patent
Bonner et al.

(10) Patent No.: US 8,207,819 B2
(45) Date of Patent: Jun. 26, 2012

(54) SYSTEM AND METHOD OF USING REWRITABLE PAPER FOR DISPLAYING PRODUCT INFORMATION ON PRODUCT DISPLAYS

(75) Inventors: Brett Bracewell Bonner, New Richmond, OH (US); Titus Arthur Jones, Hebron, KY (US); Dion Brent Perkins, Cincinnati, OH (US)

(73) Assignee: Sunrise R&D Holdings, LLC, Cincinnati, OH (US)

( * ) Notice: Subject to any disclaimer, the term of this patent is extended or adjusted under 35 U.S.C. 154(b) by 625 days.

(21) Appl. No.: 12/401,986

(22) Filed: Mar. 11, 2009

(65) Prior Publication Data

US 2010/0109839 A1 May 6, 2010

Related U.S. Application Data

(60) Provisional application No. 61/069,076, filed on Mar. 12, 2008.

(51) Int. Cl.
  *G05B 19/00* (2006.01)
  *B41J 21/16* (2006.01)
  *B41J 29/42* (2006.01)
(52) U.S. Cl. .......... 340/5.91; 400/279; 400/352
(58) Field of Classification Search .......... 340/5.91; 400/82, 352, 357, 279, 705.1; 715/744; 382/161; 178/19.01; 345/30, 1.1; 370/338; 235/385
See application file for complete search history.

(56) References Cited

U.S. PATENT DOCUMENTS

| | | | |
|---|---|---|---|
| 3,159,937 A * | 12/1964 | Barnes | 40/446 |
| 5,172,314 A | 12/1992 | Poland et al. | |
| 5,401,947 A | 3/1995 | Poland | |
| 5,423,617 A * | 6/1995 | Marsh et al. | 400/82 |
| 5,726,431 A | 3/1998 | VanDonkelaar et al. | |
| 6,089,453 A | 7/2000 | Kayser et al. | |
| 6,199,753 B1 | 3/2001 | Tracy et al. | |
| 6,404,335 B1 | 6/2002 | Ohno et al. | |
| 6,522,641 B1 | 2/2003 | Siu et al. | |
| 6,565,173 B1 | 5/2003 | Murcia et al. | |
| 6,659,344 B2 | 12/2003 | Otto | |

(Continued)

FOREIGN PATENT DOCUMENTS

JP 04-372098 12/1992

(Continued)

OTHER PUBLICATIONS

Office Action issued in Japanese Patent Application No. 2011-500817, mailed Mar. 2, 2011, pp. 1-2.

(Continued)

*Primary Examiner* — Daniel Wu
*Assistant Examiner* — Mancil Littlejohn
(74) *Attorney, Agent, or Firm* — Pillsbury Winthrop Shaw Pittman LLP

(57) ABSTRACT

The invention provides systems, methods, and computer program products for the display of product information in or about a store. In particular, systems and methods are provided that use information from an in-store communication network to display product information on a rewritable paper at designated points within or about a store including product displays. A system and method for communicating through the in-store communication network printing and erasing instructions from a system controller to a printer located on a product display for printing and erasing the product information on the rewritable paper positioned about a display surface of the product display.

18 Claims, 8 Drawing Sheets

U.S. PATENT DOCUMENTS

| | | |
|---|---|---|
| 6,837,436 B2 | 1/2005 | Swartz et al. |
| 6,879,574 B2 | 4/2005 | Naghian et al. |
| 6,924,781 B1 | 8/2005 | Gelbman |
| 7,131,584 B2 | 11/2006 | Stephenson et al. |
| 7,287,001 B1 | 10/2007 | Falls et al. |
| 7,301,455 B2 | 11/2007 | McKenna et al. |
| 7,504,937 B2 | 3/2009 | McKenna et al. |
| 2002/0083145 A1 | 6/2002 | Perinpanathan |
| 2003/0133418 A1 | 7/2003 | Marshall et al. |
| 2004/0235468 A1 | 11/2004 | Luebke et al. |
| 2005/0080894 A1 | 4/2005 | Apostolopoulos et al. |
| 2005/0216339 A1 | 9/2005 | Brazell et al. |
| 2005/0218218 A1 | 10/2005 | Koster |
| 2006/0009152 A1 | 1/2006 | Millard et al. |
| 2006/0181458 A1 | 8/2006 | Niu |
| 2006/0186973 A1 | 8/2006 | Satou |
| 2006/0266825 A1 | 11/2006 | Do et al. |
| 2006/0293779 A1 | 12/2006 | Nishri |
| 2007/0063837 A1 | 3/2007 | McKenna et al. |
| 2007/0073554 A1 | 3/2007 | Flinn et al. |
| 2007/0094080 A1 | 4/2007 | Wiken |
| 2007/0096876 A1 * | 5/2007 | Bridgelall et al. ........... 340/10.1 |
| 2007/0250613 A1 | 10/2007 | Gulledge |
| 2008/0025208 A1 | 1/2008 | Chan |
| 2008/0030319 A1 | 2/2008 | McKenna et al. |
| 2008/0032705 A1 | 2/2008 | Patel et al. |
| 2008/0040509 A1 | 2/2008 | Werb et al. |
| 2008/0043053 A1 * | 2/2008 | Suzuki ........................... 347/17 |
| 2008/0059297 A1 | 3/2008 | Vallier et al. |
| 2008/0074254 A1 | 3/2008 | Townsend et al. |
| 2008/0113614 A1 | 5/2008 | Rosenblatt |
| 2008/0170580 A1 | 7/2008 | Goldman et al. |
| 2009/0125377 A1 | 5/2009 | Somji et al. |

FOREIGN PATENT DOCUMENTS

| | | |
|---|---|---|
| JP | 08-290774 | 11/1996 |
| JP | 2007/300572 | 11/2007 |
| WO | WO9631839 A1 | 10/1996 |
| WO | 03/075125 | 9/2003 |
| WO | 2006137065 A2 | 12/2006 |
| WO | 2007/002941 | 1/2007 |

OTHER PUBLICATIONS

Repas, Robert, "Industrial Sensing the Wireless Way," Machine Design, Jan. 6, 2005, pp. 104-110, V77 No. 1.

* cited by examiner

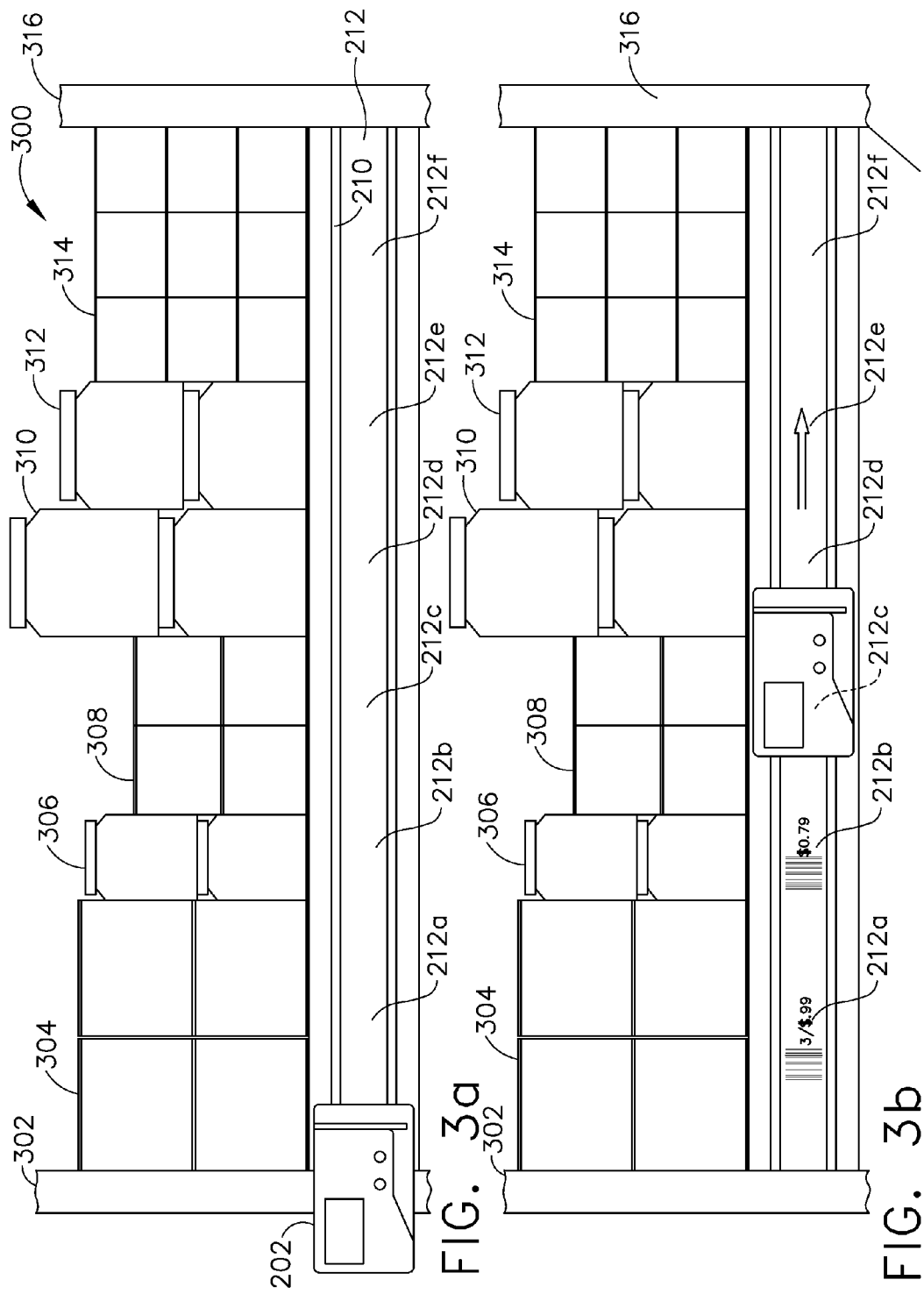

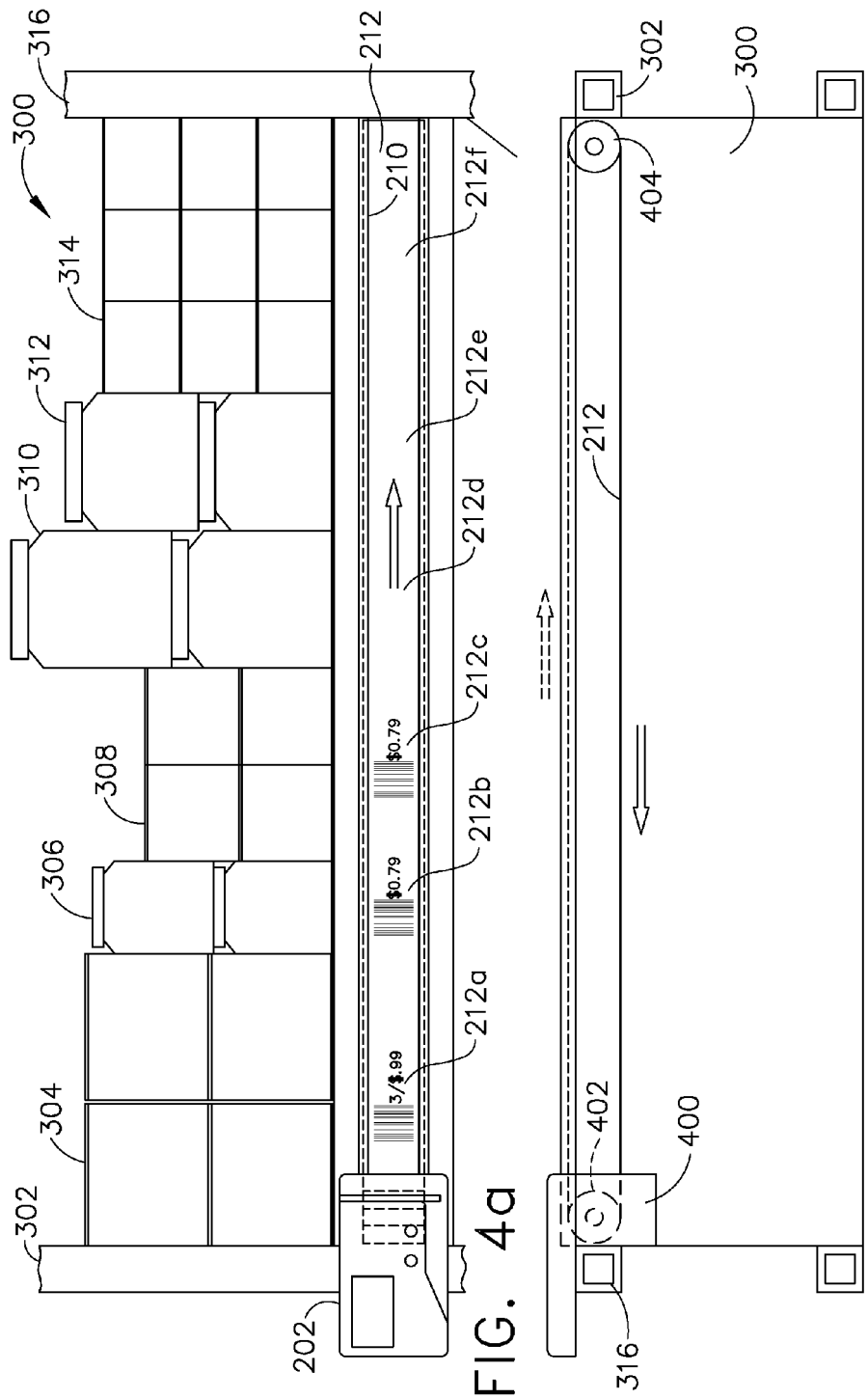

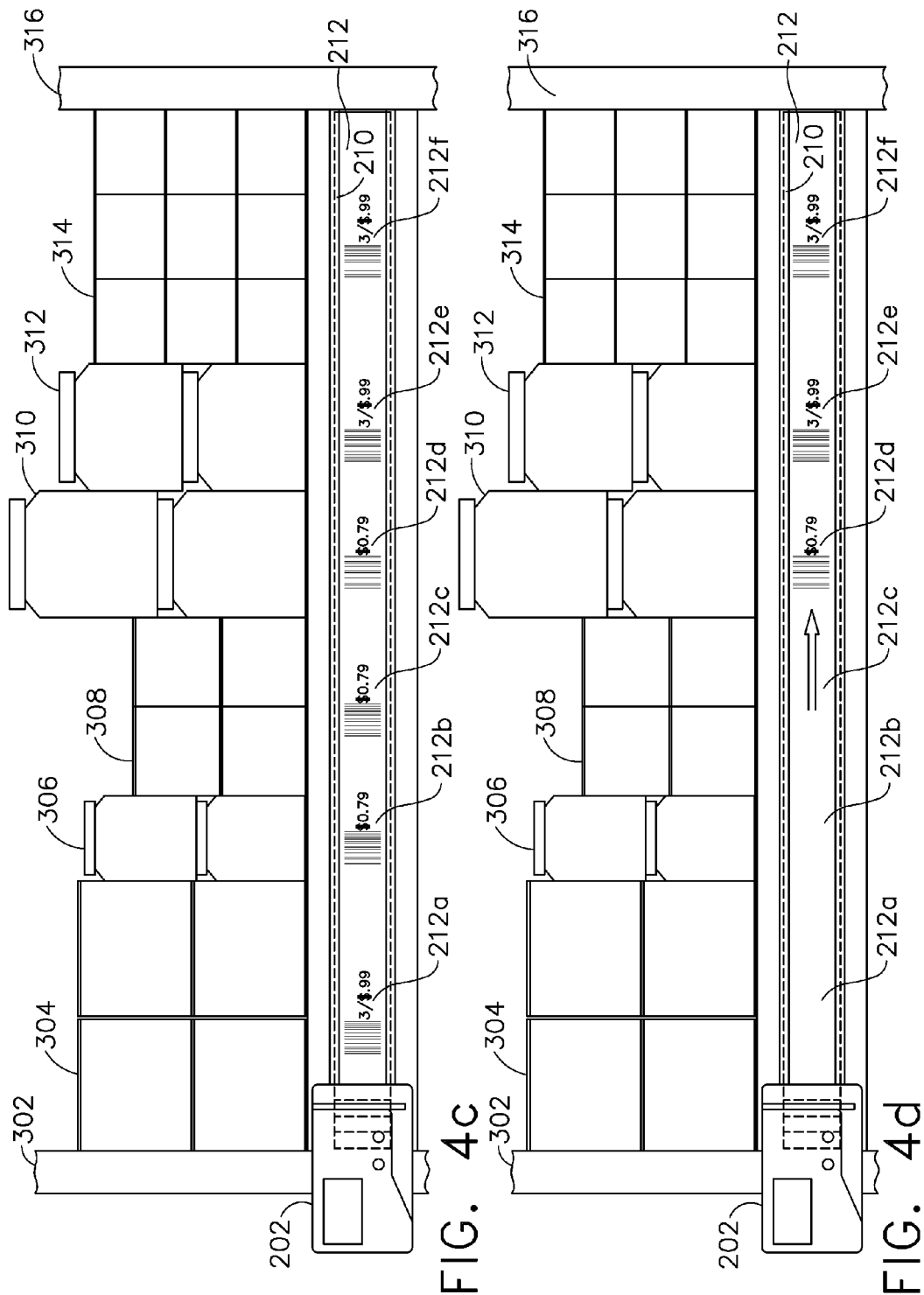

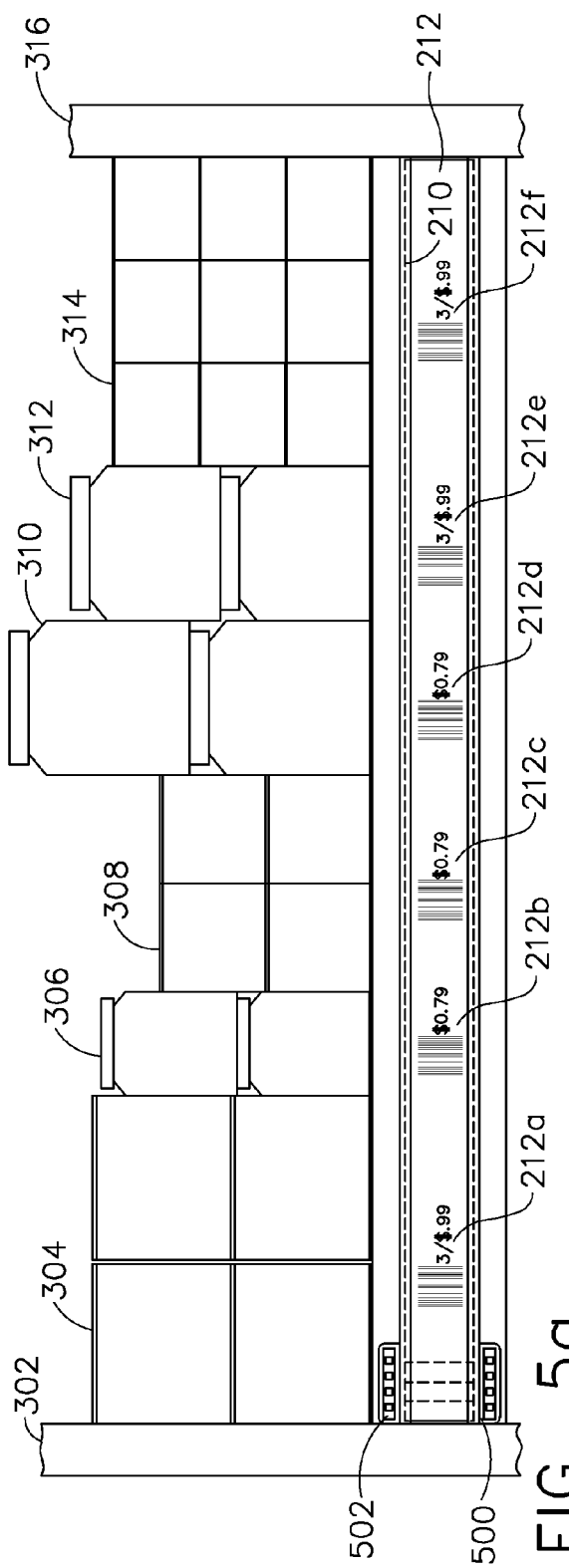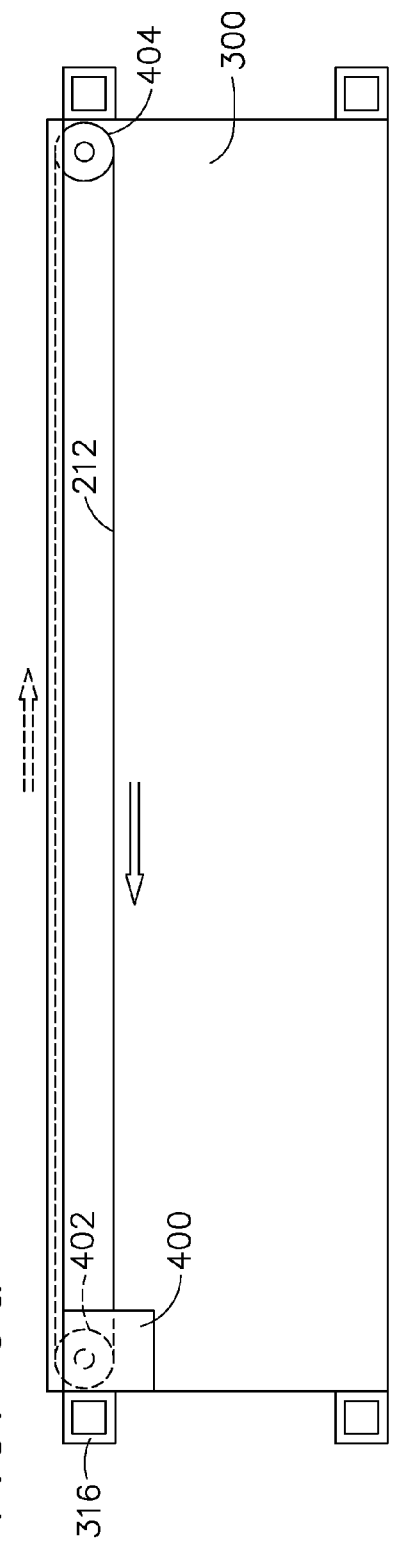

SYSTEM AND METHOD OF USING REWRITABLE PAPER FOR DISPLAYING PRODUCT INFORMATION ON PRODUCT DISPLAYS

CLAIMS PRIORITY TO RELATED APPLICATIONS

This patent application cross-references and claims priority to U.S. Provisional Patent Application 61/069,076 filed on Mar. 12, 2008, which are herein incorporated by reference in full.

BACKGROUND OF THE INVENTION

1. Field of Invention

The invention relates to systems and methods for the display of product information in or about a store. In particular, systems and methods are provided that use information from an in-store communication network to display product information at designated points within or about a store including, for example, retail shelves or product displays. In exemplary embodiments of the systems and methods herein, a thermal printhead selectively heats and creates product information on rewritable thermochromatic paper at the product display.

2. Description of the Related Art

Product information in the form of price tags, end displays, labels, etc. are critical in helping consumers make a decision about purchasing a product. Warehouses also use product information along with retrieval and location information to determine pertinent information about a product. While the placement of product information is invaluable across the different applications, the display of product information for products or items within a location can be costly due to expenses associated with the labor required, printing and delivery, materials, and the like. Retailers, including grocery stores, convenience stores, clothing stores, consumer goods stores, specialty stores, and manufacturing facilities, spend a significant amount of time and money each week updating product information, including for example, prices, regarding each product. A single store in a supermarket chain may require about 10,000 new labels each week. At a cost of about 70 cents per label, including printing services and labor, updating product tags on shelving is a costly expense to supermarkets.

The current state of the art includes producing updated product labels at a store or at an off-store location each week, shipping the updated product labels to the store, and distributing the updated product labels to store personnel. Such system is fraught with the potential for error. It requires enormous costs associated with the printing and shipping of the product tags. Errors in printing lead to discarded paper, material, and manpower hours.

Scores of store personnel are required to inspect a location and install product information at different product displays. Such store personnel are needed to first review and confirm product information such as, for example, sale prices or Universal Product Code (UPC) codes. Once the product information has been inspected, reviewed, and confirmed, the product information is cross-checked manually by store personnel to ensure that the product information posted for the respective items or products is accurate. If not, the store personnel will obtain the updated product information which will then be printed and installed.

Then, the store personnel manually inspect remove the outdated product tags from each shelf's frame, tear perforated dotted lines to obtain individual product tags, and replace outdated product tags with the updated product tags containing the updated product information. The overall process is inefficient, labor-intensive and costly.

What is needed is a system and method wherein the product tags are automatically updated without the aid of individual store clerks. The prior art includes solutions to the problem such as RFID labels. However, the mechanical vulnerability of the RFID-inlay is higher than the ordinary label. RFID labels have a higher cost than ordinary labels. Thus, retailers who purchase RFID labels often justify the expense by using RFID labels on agglomerations of more than one product, and using regular labels on individual products. Also, RFID labels included in these solutions are easily damaged, and depending on the angle of sight, are hard to read by individuals. Furthermore, such systems require significant amounts of power since the displays are in operation the majority of the time.

As such, there is a need for systems and methods for the display of product information that is efficient, cost-effective, less labor intensive, and less power consumption. There is also a need for a less materially wasteful system for displaying product information that also avoids the weekly tasks of sorting, installation and removal of product tags.

SUMMARY OF THE INVENTION

The illustrative embodiments described herein provide a system for displaying product information on a product display in a store. The system comprises an in-store communication network positioned about the store at least one product display, a rewritable paper, a printer, and a system controller. The in-store communication network is in operative communication with a printer. The at least one product display is positioned within the store, wherein each of the at least one product displays comprises at least one display surface. The rewritable paper is positioned about the at least one display surface. The printer is positioned on the rewritable paper. The system controller wirelessly communicates through the in-store communication network a command to the printer to print the product information pertaining to at least one product displayed on the at least one product display. The printer prints the product information upon the rewritable paper creating printing information. The printer communicates the printing information to the system controller. The system controller is positioned into operable connection to the printer, whereby the system controller comprises a database of the product information. The system controller is configured to select the product information, locate the printer within the store, send the product information to the printer, and control the printing and erasure of the product information by the printer on the rewritable paper.

Furthermore, a method is provided for communicating product information regarding a product at a store. The method comprises the steps of identifying the product to be displayed to select the product information that corresponds with the product; determining a product display position of the product on a display surface of a product display based on a product layout for the store; locating a printer on the display surface of the product display; sending the product information to the printer through an in-store communication network positioned about the store; and controlling the printing and erasure of the product information by the printer on a rewritable paper.

Finally, described herein is a computer program product comprising a computer usable medium having control logic stored therein for causing a system controller to select product information; locate at least one printer; send product information to the at least one printer; and control the printing or erasure of the product tag by the at least one printer on a rewritable paper.

Further features and advantages of embodiments of the present invention, as well as the structure and operation of these embodiments of the present invention, are described in detail below with reference to the accompanying drawings.

DESCRIPTION OF THE REFERENCED NUMERALS

In reference to the drawings, similar reference characters denote similar elements throughout all the drawings. The following is a list of the reference characters and associated element:

100 General flowchart 100 according to an exemplary embodiment of the present invention
202 Printer
204 System controller
206 First database
208 Second database
210 Track
212 Rewritable Paper
212a First strip position
212b Second strip position
212c Third strip position
212d Fourth strip position
212e Fifth strip position
212f Sixth strip position
300 Product display
302 First shelf post
304 First product
306 Second product
308 Third product
310 Fourth product
312 Fifth product
314 Sixth product
316 Second shelf post
400 Mechanical system
402 First Pulley
404 Second Pulley
500 First adaptable plug
502 Second adaptable plug

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements and in which:

FIGS. 3A-3C show operation of the system according to an exemplary embodiment of the invention.

FIGS. 4A-4D show operation of the system according to another exemplary embodiment of the invention.

FIGS. 5A-5B show operation of the system according to a further exemplary embodiment of the invention.

DETAILED DESCRIPTION

Figure 1:
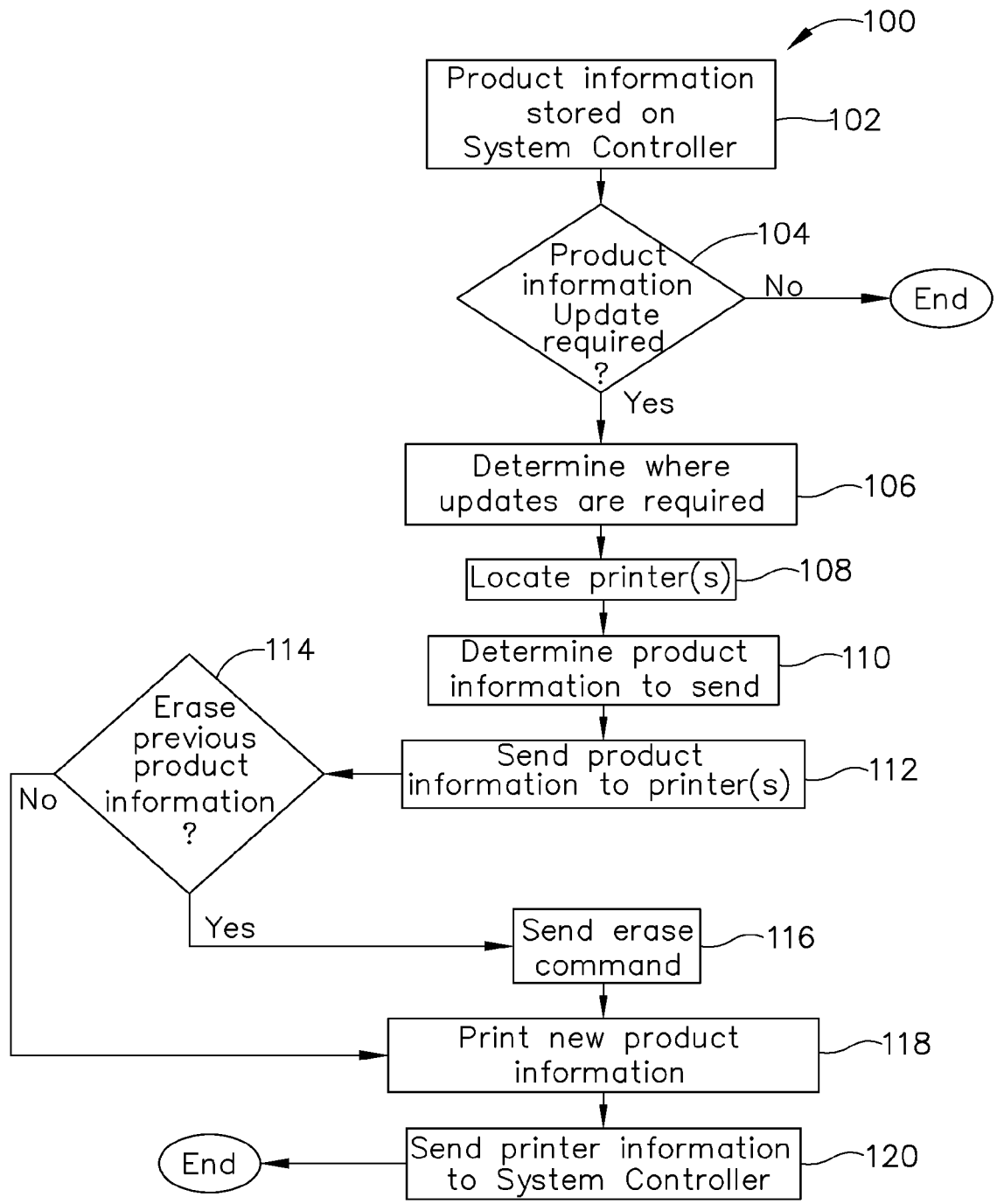
FIG. 1 is data and operational flowchart according to an exemplary embodiment of the present invention.

Embodiments of the present invention are directed to systems and methods for the display of product information in or about a store, which herein include but are not limited to the following: grocery stores, convenience stores, department stores, consumer goods stores, manufacturing facilities, warehouses, storage facilities, distribution centers and retail stores.

The systems and methods herein are controlled by a system controller, which includes one or more computers and includes a database of the product information. The store, through its business executives and/or store managers, determines the identity of products to be displayed for purchase, creating a weekly product information list in the database of the product information, which is stored within the system controller.

In exemplary embodiments the system controller is physically located within the store and the system controller routes, organizes, and manages data communicated through an in-store communication network. In alternative exemplary embodiments, the system controller is physically located outside of the store, but the system controller communicates with a central computer physically located within the store and associated with the in-store communication network. Communication between the system controller and the communication network occurs through the Internet or through a similar geographically wide communication network.

In exemplary embodiments, the in-store communication network is a communication multi-network. The communication multi-network comprises two or more communication networks, such as, for example, one or more mesh communication networks, one or more star communication networks or a combination thereof.

Exemplary embodiments of the systems and the methods include one or more product displays positioned within the store. Exemplary embodiments of the one or more product displays, such as, for example, store shelves, comprise a display surface for product information, such as, for example, price tags, to be displayed. The display surface comprises a first face that is front facing for visual display, and a second face that faces the back of the shelves.

Moreover, exemplary embodiments comprise a rewritable paper positioned in an adjacent and parallel manner to the first face of the display surface. The rewritable paper is configured with two faces: a top face and a bottom face. The top face of the rewritable paper comprises thermochromatic media for thermal printing and thermal erasing of visual data.

Exemplary embodiments of the printer comprise a thermal printhead for printing on the rewritable paper. In thermal rewritable technology, images are made to chemically appear or disappear through controlled application of heat. Images appear on rewritable media when certain high temperatures are applied to the media followed by rapid cooling. Images are erased when certain lower temperatures are applied to the media followed by rapid cooling. In exemplary embodiments, the printer comprises a frictionless laser thermal printhead for use in a highly-reliable system that reduces the store's costs associated with purchasing replacement thermochromatic media and printheads.

In exemplary embodiments, the rewritable paper is configured with a printer such that the printer is fixed into a substantially stationary position and a loop of the rewritable paper rolls across one or more printheads of the printer. In other exemplary embodiments, the printer is releasably positioned onto the first face of the display surface so that the printer rolls across the top face of the rewritable paper, wherein the rewritable paper is substantially stationary on the first face of the display surface.

In the exemplary embodiments in which the printer is in a substantially stationary position, the rewritable paper is positioned onto a pulley system having one or more pulleys for feeding the rewritable paper across the first and second face of the display surface of the product display and through the printer. In such embodiments, the rewritable paper is in the form of a loop positioned so that it is looped around the display surface of the product display. In such embodiments, for about one-hundred eighty degrees of the loop of rewritable paper the top face of the rewritable paper faces the aisle of the store and the bottom face of the rewritable paper faces the first face of the display surface, and for the other about one hundred eighty degrees of the loop of rewritable paper the top face faces the back of the product display and the bottom face of the rewritable paper faces the second face of the display surface. The printer is positioned in a substantially stationary manner onto the second face of the display surface. The printer is configured to print and erase the product information upon the top face of the rewritable paper as the loop of rewritable paper rolls past the one or more printheads of the printer.

In the exemplary embodiments in which the printer is releasably positioned, the printer is releasably positioned on the first face of the display surface to allow for its use on a first face of a second display surface or for another application. Herein, the rewritable paper, which is about the length of the product display, is fixed into a stationary position upon the first face of the display surface. Herein the releasably attached printer rolls across a set of tracks on the first face of the display surface to print and erase upon the first face of the rewritable paper.

In exemplary embodiments, the systems and the methods include a housing that is used to store the printer before and after the printer has printed and/or erased the product information on the rewritable paper. Furthermore, the housing is used to store the printer when the printer is not in use. In exemplary embodiments, the housing is in communication with the system controller through the in-store communication network and receives printing information which is later relayed to the printer. The system controller wirelessly transmits via the in-store communication network to the printer the product information to be printed and the product information to be erased. The product information includes, for example, location instructions regarding one or more specific locations on the rewritable paper wherein the printer is to erase and to print. The one or more specific locations on the rewritable paper correlate with positions on the product display wherein the one or more products are (or will be) displayed within the store. In other words, the system produces product information, such as price tags, on the display surface of the product display, such as, for example, a retail shelf, that line up with the shelf positions of the one or more products set upon the retail shelf.

In exemplary embodiment of the present invention, the system includes one or more printers that is configured to pick up or install one or more product tags. The one or more product tags are installed on the face of the display right under the respective products. In such embodiments, the printer is configured to pick up the one or more product tag before printing and/or erasing the product information from the one or more product tags.

In exemplary embodiments, the printer is further equipped with a thermal scanner. The thermal scanner is capable of determining whether there are sufficient quantities of displayed products. The printer communicates the quantity of the displayed products with the system controller. When quantities of the displayed products are at predetermined low levels, the system controller compares the quantities of the displayed products with the quantities of undisplayed products in stock. Next, the system controller transmits signals to store managers and store personnel to stock the product displays with the undisplayed products. Finally, the system controller and transmits orders to suppliers when the quantity of the displayed products and the quantity of undisplayed products are at predetermined low levels.

In exemplary embodiments, the product display include illumination mechanisms configured to illuminate the product information printed on the rewritable paper to assist individuals in reading the product information as printed on the rewritable paper.

Exemplary embodiments of the present invention are directed to a computer program product with a computer usable medium having control logic stored on it for causing a computer to select the product information, locate one or more printers, send the product information to the printer, and control the printing or erasure of the product information by the printer on the rewritable paper.

A general flowchart 100 according to an exemplary embodiment of the present invention is shown in FIG. 1. Even though steps 102 through 120 herein are described with respect to a single product and associated product information, exemplary embodiments of the system and method of using similar simultaneously replicate the steps 102-120 for substantially all data, and substantially all of the product information regarding substantially all of the products in the store.

First in step 102, data pertaining to the product information is stored on a store server, such as, for example, the system controller 204. The product information includes, but is not limited to, price information, product location information, placement information, etc. In step 104, the system controller determines whether updates to the product information displayed on the rewritable paper on the display surface of the product display are required for the products in or about the store. In exemplary embodiments, step 104 is followed on a predetermined time interval, while in other embodiments, step 104 is conducted manually by an operator working on the system controller. If no updates are required, the process stops or ends until the next update determination.

Otherwise, once a determination is made that updates are required for the products in or about the store, the system moves onto step 106 wherein the system controller determines where the updates are required. Next, in step 108, the system controller locates the printer 202 at the product displays, for example, the retails shelves, where updates are required. In exemplary embodiments, the system controller holds information pertaining to a product location, a strip position, type, status, etc.

Next, in step 110, the system controller determines the product information to send to the printer. Once this determination has been made, the system controller sends the product information to the printer. See step 112.

After sending the product information to the printer, the system controller determines whether the rewritable paper contains previously printed product information that must be erased before the updated product information can be printed. See step 114. In exemplary embodiments of the present invention, the system controller creates and maintains a historical operational database of each printer and for each display surface of each the product displays regarding previous data printed, data erased, time of previous printing, erasure, etc. Thus, at step 114, the system controller uses the historical operational database to determine if the system continues directly to step 118 or whether the system must first pass through step 116, where the erase command is transmitted to the printer.

If step 116 is required by the calculations made in step 114, the system controller transmits erase commands to the printer, and the printer carries them out at a strip position on the rewritable paper before the printer can print. If after step 114 step 116 is not required, then the system continues directly to step 118 where the system controller transmits the product information to the printer. The printer then prints the product information onto the strip position of the rewritable paper.

Finally, in step 120, the printer sends the system controller the printing information that comprises a confirmation that all printing and erasing commands have been completed along with any other pertinent information regarding the printer, for example, printer inks levels, data printed, shelf positions where the data was printed, printing time, etc. The printing information is then saved on the system controller and is added to and updates the historical operational database.

Figure 2:
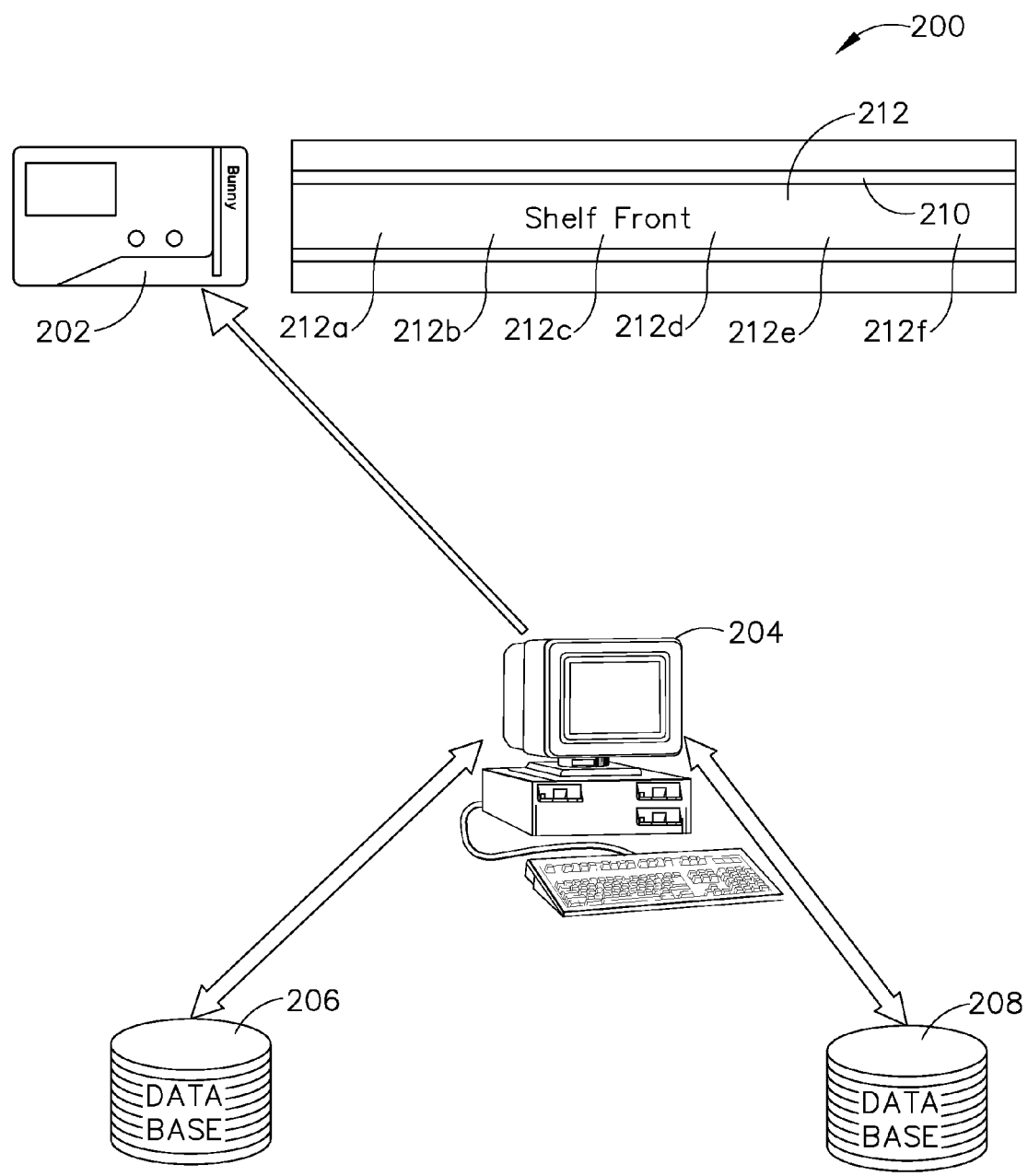
FIG. 2 is a work flow schematic showing parts of the system along with data flows all according to an exemplary embodiment of the present invention.

A work flow schematic showing parts of the system along with data flows all according to an exemplary embodiment of the present invention is shown in FIG. 2. The first face of the display surface 200 of the product display is shown with the top face of the rewritable paper 212.

The length of each rewritable paper varies depending on, for example, the length of the product display. The rewritable paper is installed along a track 210. The printer is configured to run the length of the track 210 when printing or erasing the product information from the rewritable paper. The printer 202 prints product information on, for example, a first strip position 212a, a second strip position 212b, a third strip position 212c, a fourth strip position 212d, a fifth strip position 212e and a sixth strip position 212f on rewritable paper. The first strip position 212a, the second strip position 212b, the third strip position 212c, the fourth strip position 212d, the fifth strip position 212e and the sixth strip position 212f are exemplary only, because the rewritable paper 212 may have less or more strip positions depending on the number of products on the product display, the retail shelf.

In exemplary embodiments, the printing information is saved on one or more databases, such as, for example, a first database 206 and a second database 208 of the system controller. In alternative embodiments of the present invention, the first database and the second database are separate from the system controller, but there still exists a communication link between the first database and the second database with the system controller, even if the first database and second database are physically separate from the system controller.

The product display system according to an exemplary embodiment of the invention is shown in FIG. 3a. FIG. 3a shows the printer 202, track 210, and the rewritable paper 212 on the first face of the display surface of the product display 300. The product display is shown with a first shelf post 302 and a second shelf post 316. Between the first shelf post and the second shelf post on a shelf surface are a first product 304, a second product 306, a third product 308, a fourth product 310, a fifth product 312 and a sixth product 314.

Upon receipt of a print command from the system controller, the printer 202 begins to print product information for the first product 304, the second product 306, the third product 308, the fourth product 310, the fifth product 312 and the sixth product 314 on the rewritable paper at the first strip position 212a, the second strip position 212b, the third strip position 212c, the fourth strip position 212d, the fifth strip position 212e and the sixth strip position 212f as shown in FIG. 3b. In exemplary embodiments, the first strip position 212a, the second strip position 212b, the third strip position 212c, the fourth strip position 212d, the fifth strip position 212e and the sixth strip position 212f of the rewritable paper—corresponds with the actual locations of the first product 304, the second product 306, the third product 308, the fourth product 310, the fifth product 312 and the sixth product 314. For clarity, in exemplary embodiments, the first strip position 212a is located directly underneath the first product 304, so that at the system controller commands the printer to print product information regarding first product at the first strip position.

In exemplary embodiments, the printer, upon reaching the second shelf post 316 rolls across the track 210 back to its original position as shown in FIG. 3a.

Figure 3C:
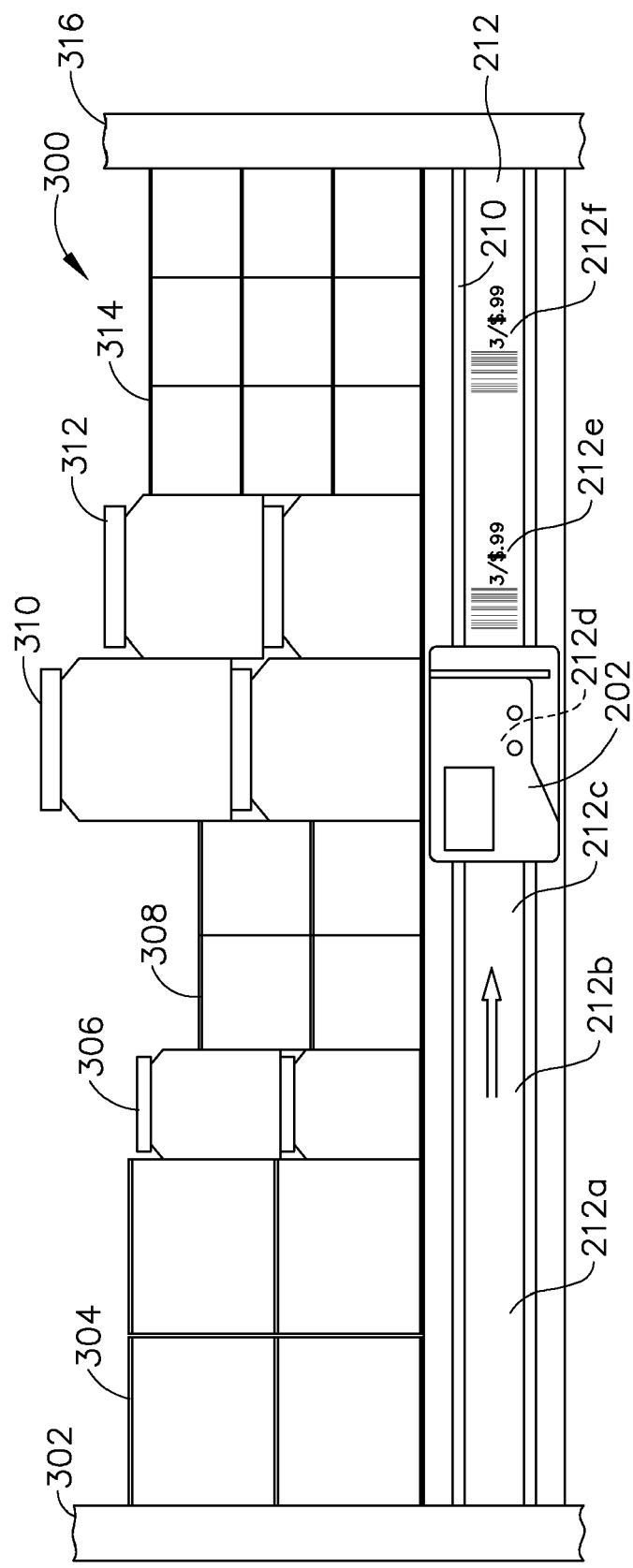

Referring now to FIG. 3c, the printer 202 is shown erasing product information from the rewritable paper strip upon receipt of an erase command from the system controller. In exemplary embodiments, the printer, upon reaching the second shelf post returns to its initial or original position after erasing the product information that was deemed outdated by the system controller. In exemplary embodiments of the present invention, the printer stops at the second shelf post and awaits additional or new commands from the system controller.

A product display system according to another embodiment of the present invention is shown in FIG. 4a and FIG. 4b. FIG. 4b shows a top view of the product display system. Here, the printer is substantially stationary and fixed at its shown position. In contrast, the rewritable paper is fed into the printer by a mechanical system 400 which includes a first pulley 402 and a second pulley 404.

The mechanical system 400, in exemplary embodiments of the present invention, is configured to receive print commands from the system controller, at which point mechanical system feeds the rewritable paper through the printer. Alternatively, or in addition to the previous described exemplary embodiment, the printer is activated once the mechanical system starts to feed the rewritable paper into the printer. Under both embodiments, the printer receives the product information and the print command at substantially the same time the mechanical system receives its print command from the system controller.

Similarly, FIG. 4c and FIG. 4d show the printer and the mechanical system operating together to erase the product information deemed outdated from the rewritable paper once that command is received from the system controller.

A product display system according to another embodiment of the present invention is shown in FIG. 5a. In this exemplary embodiment, the printer is configured to be detached from the track. The printer is further configured to be attached to the mechanical system by way of a first adaptable plug 500 and a second adaptable plug 502. In an exemplary embodiment of the present invention, the printer is used at another track on another display surface or on another product display. In another exemplary embodiment of the present invention, the printer is configured to receive data from the system controller for different product displays and the first product 304, the second product 306, the third product 308, the fourth product 310, the fifth product 312 and the sixth product 314. The printer is further configured to identify each display surface of each product display in order to determine the correct the product information to print. Alternatively, the system controller determines the product information to be sent to the printer based on the location of each product display.

Figure 6:
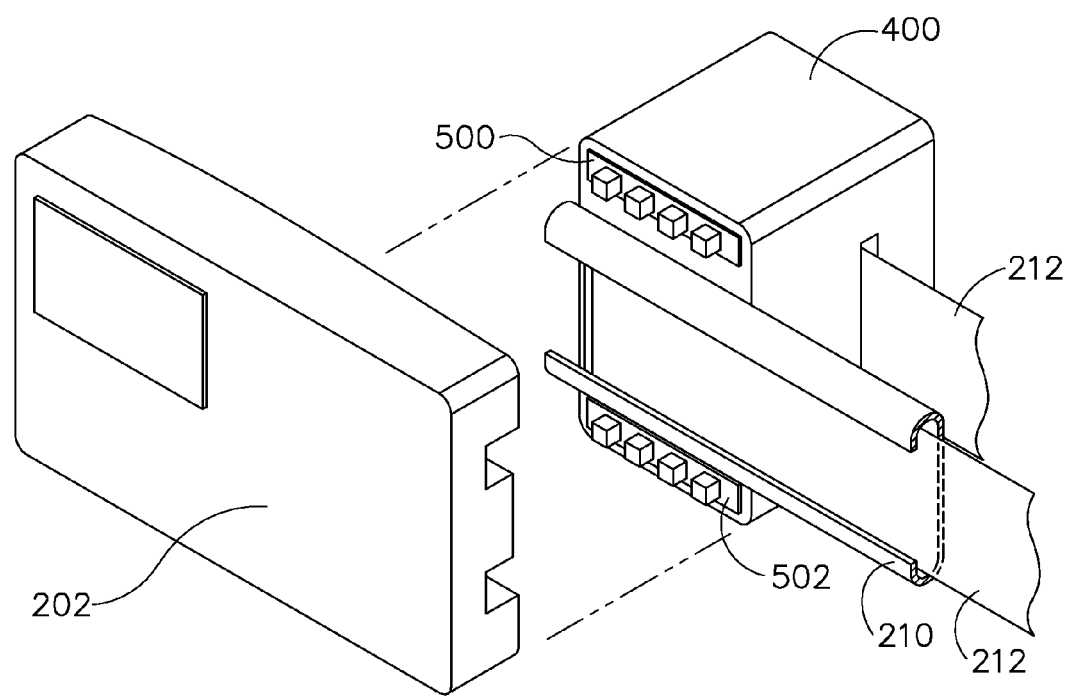
FIG. 6 shows a detailed view of portions of the system according to another embodiment of the invention.

FIG. 6 shows the detachable embodiment of the printer in relationship to the mechanical system. The printer is shown detached from the mechanical system. The printer is held in place by the first adaptable plug 500 and the second adaptable plug 502. The rewritable paper is fed through the mechanical system and then through the printer.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for displaying product information on a product display in a store, the system being comprised of:
   an in-store communication network positioned about said store, said in-store communication network being in operative communication with a printer;
   at least one product display positioned within said store, wherein each said at least one product display comprises at least one display surface;
   a rewritable paper positioned about said at least one display surface;
   said printer positioned on said rewritable paper; whereby a system controller wirelessly communicates a command through said in-store communication network to said printer to print said product information pertaining to at least one product displayed on said at least one display surface; whereby said printer prints said product information upon said rewritable paper creating printing information; whereby said printer communicates said printing information to said system controller; and
   the system controller positioned into operable connection to said printer whereby said system controller comprises a database of said product information;
   wherein said system controller is configured to:
      select said product information;
      locate said printer within said store;
      send the product information to said printer; and
      control the printing and erasure of said product information by said printer on said rewritable paper; and
   wherein the in-store communication network commands said printer to erase said product information pertaining to said at least one display surface; whereby said printer erases said product information upon said rewritable paper creating erasing information, whereby said printer communicates said erasing information to said system controller.

2. The system of claim 1, wherein said in-store communication network is a communication multi-network, said communication multi-network comprising at least one mesh communication network and at least one star communication network.

3. The system of claim 1, wherein said system controller manages, organizes, and routes said product information and said printing information transmitted through said in-store communication network.

4. The system of claim 1, wherein said product display further comprises a housing for storing the printer when said printer is not in operation; whereby said housing is in communication with said system controller for receipt of printing commands and erasing commands to be relayed to said printer.

5. The system of claim 1, further comprising a mechanical system for feeding a loop of said rewritable paper through said printer.

6. The system of claim 1, wherein the system is in communication with at least one external network to which it communicates product information.

7. The system of claim 1, wherein said printer is configured to pick up or install at least one product tag on said at least one display surface of said at least one product display, wherein the printer is further configured to print or erase product information on said at least one product tag.

8. The system of claim 1, wherein the printer comprises a thermal scanner for determining the quantity of products on the product display, whereby said thermal scanner is in communication with the system controller through the in-store communication network, whereby said thermal scanner transmits the quantity of products on the product display to the system controller.

9. The system of claim 1, wherein said at least one display surface comprises a lighting system configured to illuminate the product information printed on the rewritable paper.

10. The system of claim 1, wherein said system controller is configured to determine each said product information to print on each said display surface based on a product layout for the store.

11. The system of claim 1, wherein the system controller compiles the erasing information with the printing information regarding said at least one display surface to create historical operational database.

12. A method for communicating product information regarding a product at a store, the method comprising:
   identifying said product to be displayed to select said product information that corresponds with said product;
   determining a product display position of said product on a display surface of a product display based on a product layout for said store;
   locating a printer positioned upon a rewritable paper positioned about said display surface of said product display;
   sending the product information to the printer through an in-store communication network positioned about said store; and
   controlling the printing and erasure of the product information by the printer on a rewritable paper via a system controller that commands the printer to erase the product information pertaining to the at least one display surface; whereby the printer erases the product information upon the rewritable paper creating erasing information, whereby the printer communicates the erasing information to the system controller.

13. The method of claim 12, wherein said method further comprises positioning a system controller in communication with said in-store communication network.

14. The method of claim 13, wherein said system controller controls, routes, organizes, and manages data transmitted through said in-store communication network.

15. The method of claim 12, wherein said in-store communication network is a communication multi-network.

16. The method of claim 15, wherein said communication multi-network comprises at least one star communication network and at least one mesh communication network.

17. The method of claim 15, wherein said communication multi-network comprises at least two star communication networks.

18. The method of claim 15, wherein said communication multi-network comprises at least two mesh communication networks.

* * * * *